Sept. 25, 1956
P. L. KNIGHT
2,764,145
BURNER APPARATUS
Filed Jan. 2, 1953
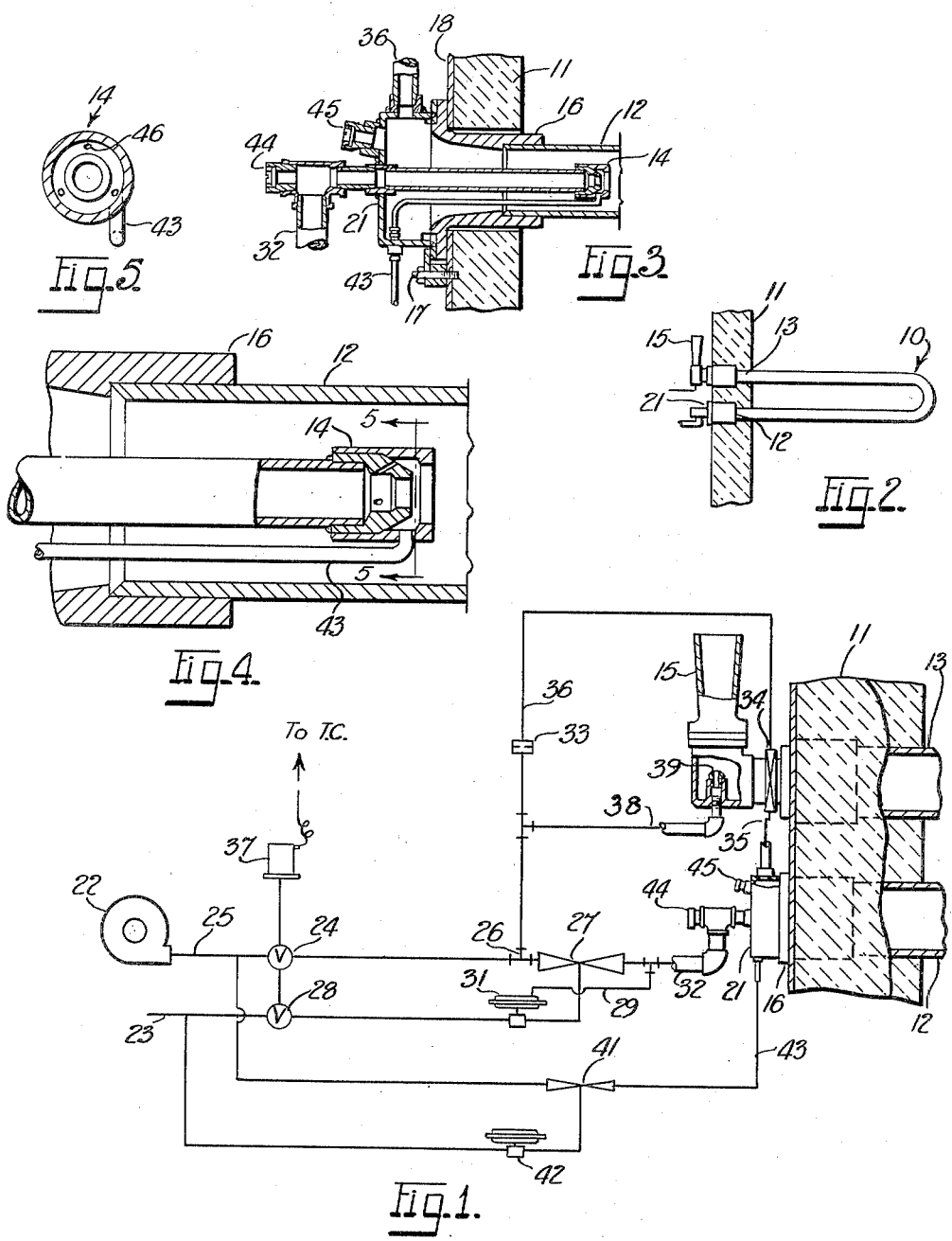
INVENTOR
P.L.Knight
BY
Charles S. Haughey agt

United States Patent Office 2,764,145
Patented Sept. 25, 1956

2,764,145

BURNER APPARATUS

Philip L. Knight, Toledo, Ohio, assignor to Surface Combustion Corporation, Toledo, Ohio, a corporation of Ohio Application January 2, 1953, Serial No. 329,364

2 Claims. (Cl. 126—91)

This invention relates to burner apparatus, and more particularly to a radiant tube burner and controls therefor. The invention provides a one valve controlled radiant tube burner having a variable length flame and below atmospheric pressure combustion, and is free from the deleterious effects of dirty atmosphere about the burner. It was the object of the inventor to provide such an improved burner apparatus so that radiant tube burner equipment would perform more reliably and safely in the presence of fumes from heat treating furnaces.

For a consideration of what I believe to be novel and my invention, attention is directed to the following portion of this specification, and the drawing and concluding claims thereof.

In the drawing:

Fig. 1 is a partially schematic illustration of radiant tube apparatus embodying the invention;

Fig. 2 is an environment sketch showing how the invention is normally to be used;

Fig. 3 is a partially sectioned view of the burner end of the radiant tube assembly of Fig. 1;

Fig. 4 is a detail view of the burner nozzle of Fig. 3; and

Fig. 5 is a sectional view of the nozzle of Fig. 4 taken on line 5—5 thereof.

The illustrated apparatus according to the invention provides a closed combustion chamber having an inlet end and an outlet end; an air operated exhauster at its outlet end; a burner nozzle having a central passage for supplying a rich mixture of fuel and air to the combustion chamber, and having an annular pilot portion; a secondary air housing for delivering a stream of secondary air to the chamber; first, second and third air conduits connected to a single valved source of air under pressure for supplying air to the central passage, the secondary air housing, and the exhauster; air-fuel mixing means for admixing with air flowing in the first air conduit a substantially constant proportion of fuel; flow proportioning means in the first, second and third air conduits for maintaining substantially constant flow proportions in said conduits; a separate conduit for delivering a stream of fuel and air tangentially to the annular pilot portion of the burner nozzle; conduit means for delivering a stream of fuel and air from the first air conduit to the annular pilot portion of the burner nozzle; and valve means for varying flow from the valved source of air responsive to demand for heat from said apparatus.

This invention is illustrated in connection with a radiant tube 10 which is utilized to supply heat to a furnace chamber formed by walls 11. Fuel is burned with air from the inlet end 12 of the radiant tube, and flue gases are exhausted from the exhaust end 13 thereof. A burner nozzle 14 is disposed in the burner end of the radiant tube, the tube being supported on the furnace wall by a mounting bracket 16 which is secured by bolts 17 to the metal binding 18 of the furnace wall. The burner nozzle is supported in the burner end of the radiant tube by a head, or closure member 21 which seals the burner end of the radiant tube against undesirable infiltration of atmospheric air.

Fuel and air for combustion are supplied by a blower 22 having an inlet connected to a supply of clean air for combustion, and a fuel supply pipe 23 which is connected to a source of fuel such as natural gas. Air passes from the blower 22 through a motor controlled valve 24 in air pipe 25, through a T 26, and through a venturi mixer 27. Fuel is delivered through pipe 23 and motor controlled valve 28 therein, through a pressure governor 31 to the mixer 27. The governor 31 is of the type having an internal spring to maintain the desired outlet pressure; the compression of the spring, and hence the maintained outlet pressure, being adjustable. The fuel air mixture passes through pipe 32 to the burner nozzle 14. Gas pressure is controlled by the governor 31 responsive to mixture pressure in pipe 32, and by selection of air venturi size in the mixer 27 and by varying the internal spring adjustment in the governor, the proportion of fuel to air may be determined over a wide range. This fuel-air ratio adjustment is designed to vary the percent of premix, hence the combustion conditions, such as flame length, in the combustion tube 10, as will presently appear. The balance of air required for combustion, or secondary air, is passed from the T 26 through a metering orifice 33 in pipe 36 where it is metered cold, and passed through a recuperator 34, shown schematically, and thence through pipe 35 to the burner head 21. The recuperator may be of the type shown in patent to Hepburn 2,188,133. The secondary air passes from the plenum chamber formed by the head 21 through a converging inlet in the mounting bracket 16 to the end of the burner nozzle where it meets the ignited fuel from the nozzle and supports combustion in a relatively long flame within the tube. The converging portion of the mounting bracket tends to reduce turbulence and straighten air flows, making far more reliable control of the flame length in the tube 10. A motor 37 actuates both air and fuel valves simultaneously to provide on-off control of the burner responsive to a furnace thermocouple T. C., but as the air valve is throttled, the gas governor 31 tracks the air to give a relatively wide turndown range. The linked gas valve 28 is opened more than proportioning demands so the governor 31 is controlling. It is provided primarily as a safety fuel shut-off to avoid gas leaks through the governor 31 when air valve 24 is closed, hence the air valve 24 provides a single valve control of the burner. A third air stream is taken from pipe 36 upstream of the metering orifice 33 and is delivered by pipe 38 and spud 39 to the eductor 15. Thus the combustion chamber in the tube 10 is maintained under a sub-atmospheric pressure, thereby assuring that upon eventual failure of the tube 10, leakage will be from the furnace atmosphere into the tube not products of combustion from within the tube into the chamber being heated. Air in the eductor supply pipe 38 is also subject to control of air valve 24, and hence the eductor effect varies with the quantity of fuel burned, and combustion tube pressure is maintained substantially constant.

To maintain ignition of the burner through on and off cycles thereof as the motor opens and closes the valve 24 responsive to the usual furnace thermocouple and control instrument, a pilot is provided. Air and fuel are drawn from the pipes 23 and 25 and passed through a pilot venturi mixer set including a mixer 41 and governor 42. The pilot premix is separately piped by tube 43 to the pilot portion of the burner nozzle 14. Thus the pilot is maintained independently of the main burner fuel supply. Sight glasses 44 and 45 are provided to allow viewing of the pilot and main burner, the pilot sight glass 45 being removable for initial ignition of the pilot.

If the central mixture is sufficiently close to stoichiometric, then to augment the pilot when fuel is passing through the nozzle 14, holes 46 may be provided; thus a minimum pilot flame is present as a holding flame, but it may be increased to meet the needs of ignition of the main combustion stream as the air valve 24 is opened and the burner is raised from pilot to full combustion operation. The fuel and air mixture for the pilot is delivered thereto tangentially by tube 43, as more clearly appears in Fig. 5. This provides a most stable pilot, assuring pilot operation entirely around the central nozzle for the main burner.

While the use of the recuperator 34 is of course not necessary, it is very useful when a large proportion of combustion air is admitted to the burner as secondary air. When substantially all the air is delivered as primary air, the mixture may be preheated instead, it being noted that for natural gas-air mixtures preheat temperatures up to 1000° F. may be handled due to an ignition delay period of several seconds, but the proportioning of the air and gas must of course be done at equal temperatures, preferably cold as shown.

I claim:

1. Burner apparatus comprising wall means forming a combustion chamber having an inlet end and an outlet end, said chamber being substantially closed intermediate said ends; a burner nozzle for delivering mixtures of fuel and air to the inlet end of the combustion chamber; fuel supply means for said burner nozzle; a secondary air housing for delivering a stream of air to the inlet end of the combustion chamber; an air-operated exhauster at the outlet end of the combustion chamber; air supply conduit means for supplying air under pressure; first, second, and third air conduits respectively for delivering air from said air supply conduit means to the burner nozzle, the secondary air housing, and the exhauster; and proportioning means for distributing substantially constant proportions of air through said first, second and third air conduits.

2. Apparatus according to claim 1 and comprising air-fuel mixing means for admixing with air flowing in the first air conduit a substantially constant proportion of fuel from said fuel supply means.

References Cited in the file of this patent

UNITED STATES PATENTS

| | | |
|---|---|---|
| 1,547,156 | Loepsinger | July 21, 1925 |
| 1,658,198 | Hosch | Feb. 7, 1928 |
| 1,788,716 | Hepburn | Jan. 13, 1931 |
| 1,788,925 | McKee | Jan. 13, 1931 |
| 1,814,910 | Ensign et al. | July 14, 1931 |
| 2,047,471 | Hepburn et al. | July 14, 1936 |
| 2,167,183 | Naab et al. | July 25, 1939 |
| 2,365,945 | Fergusen | Dec. 26, 1944 |
| 2,432,314 | Holthouse | Dec. 9, 1947 |
| 2,514,806 | Shapter | July 11, 1950 |
| 2,602,440 | Corns | July 8, 1952 |
| 2,627,308 | Clark | Feb. 3, 1953 |

FOREIGN PATENTS

| | | |
|---|---|---|
| 630,672 | Germany | June 3, 1936 |